(12) United States Patent
Nakagawa

(10) Patent No.: US 6,469,852 B1
(45) Date of Patent: Oct. 22, 2002

(54) DISK ON WHICH SERVO PATTERN IS RECORDED AND ARITHMETIC PROCESSING METHOD FOR SERVO PATTERN READ FROM THE DISK

(75) Inventor: Masayoshi Nakagawa, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/379,139

(22) Filed: Aug. 20, 1999

(30) Foreign Application Priority Data

Aug. 24, 1998 (JP) .......................... 10-236800

(51) Int. Cl.[7] ............................ G11B 5/09; G11B 21/10
(52) U.S. Cl. .................... 360/48; 360/77.08; 360/78.04
(58) Field of Search ............................ 360/48, 77.08, 360/77.12, 75, 78.04, 78.06, 77.05, 77.11, 78.14; G11B 21/10

(56) References Cited

U.S. PATENT DOCUMENTS

| | | | |
|---|---|---|---|
| 5,138,511 A | 8/1992 | Hoshimi et al. ............ 360/135 |
| 5,177,651 A | * 1/1993 | Moraru et al. ........... 360/77.08 |
| 5,268,803 A | * 12/1993 | Sugita et al. ............ 360/77.08 |
| 5,383,068 A | * 1/1995 | Shimizu et al. .......... 360/78.06 |
| 5,392,174 A | * 2/1995 | Suzuki .................... 360/78.06 |

* cited by examiner

*Primary Examiner*—Regina Neal Holder
*Assistant Examiner*—Dan I Davidson
(74) *Attorney, Agent, or Firm*—Brinks Hofer Gilson & Lione

(57) ABSTRACT

The A burst and B burst for tracking are recorded with the width of track pitch, the address signal is recorded as the same signal with the interval equal to two track pitches (2×Tp) and B1 bit is also recorded with deviation of one track pitch from the address signal with the interval equal to two track pitches (2×Tp). Therefore, the servo pattern of one track can be written as much as one track pitch and thereby the recording time can be shortened. Moreover, accurate track address can be calculated by the correcting process using the B1 bit.

7 Claims, 6 Drawing Sheets

DISK ON WHICH SERVO PATTERN IS RECORDED AND ARITHMETIC PROCESSING METHOD FOR SERVO PATTERN READ FROM THE DISK

BACKGROUND OF THE INVENTION

1. Field of the Invention

The present invention relates to a disk on which a servo pattern to compensate for head tracking is formed at the predetermined location on the track such as a magnetic disk and particularly to a disk on which signals are never switched between track pitches and an arithmetic processing method for servo pattern read from the disk.

2. Description of the Related Art

In a high capacity flexible magnetic disk and a hard disk, a servo pattern to compensate for tracking of a magnetic head is formed on tracks on its recording surface.

FIG. 6 illustrates a recording surface of a disk, while FIG. 7 illustrates an enlarged example of the servo pattern recorded on the tracks of the recording surface. On the recording surface of the disk, the tracks T are concentrically set and a servo pattern which is continuous on the radius line R of the disk is formed in a plurality of areas.

In FIG. 7, the track center of each track 1, 2, 3, . . . is indicated by a chain line Tc. Tp indicates the distance (track pitch) between the neighboring track centers. The scanning direction of the magnetic head H for reproduction is defined in the right direction in the figure and track width Tw of the magnetic head for reproduction is narrower than the track pitch Tp.

In the servo pattern a preamble (Sync) and an address mark (AM) are recorded first. The preamble and address mark are signals continuous without any switching in the radius direction of a disk crossing each track. The preamble is the signal in which single frequency is continuous toward the head scanning direction and when the magnetic head reproduces this signal, an amplifier gain of the reproducing circuit is fixed (AGC lock). Moreover, timing of the signal reproduction is set, for example, by locking of the PLL circuit with the preamble. Moreover, timing until the next address signal can be set by reproduction of the address mark explained above.

In the address signal, an address value such as track number (track No-) is recorded and this address signal is recorded within a constant width Aw in both sides of the track center Tc. This address signal can express an address value with a plurality of bits. The address signal is different for each track 1, 2, 3, . . . and the width Aw has the width interval equal to that of the track pitch Tp and the address signal is switched at the center between the track centers Tc.

Following the address signal, the A burst signal and B burst signal are recorded as the tracking signals. These A burst signal and B burst signal are recorded sandwiching the track center to have a time difference in the head scanning direction. The A burst signal and B burst signal are recorded in the equal amplitude intensity and are repetitive signals of the single frequency.

In the seek operation, whether the magnetic head H for reproduction has reached the target track or not is determined by reading the address signal. Moreover, when the magnetic head H for reproduction is scanning on the track, a servo gain is fixed by reading the preamble, moreover the single frequency signal of preamble is sampled to become the reference clock and thereby the address signal is read and the A burst signal and B burst signal are read. The tracking control is performed so that the center of track width Tw of the magnetic head H for reproduction is matched with the track center Tc by comparison between the reproduced intensity of the A burst signal and B burst signal read through timing difference.

In the servo pattern of the related art as illustrated in FIG. 7, the A burst signal and B burst signal are recorded to be switched defining the track center Tc as the boundary. Meanwhile, the address signal is the same signal in the width Aw defining the track center Tc as the center thereof and this address signal is recorded to be switched at the center of the track centers Tc.

Therefore, for the recording of servo pattern illustrated in FIG. 7, it is required to continuously write each signal for each half track pitch (Tp/2). Namely, the address signal 1-*a* and A burst signal A1 are recorded in the width of Tp/2. Next, the magnetic head for recording is fed for half track pitch (Tp/2) in the radius direction to record the address signal 2-*a* and A burst signal A2. This process is performed sequentially. The address signals 2-*a* and 2-*b* are same signals. Moreover, 3-*a* and 3-*b*, 4-*a* and 4-*b*, 5-*a* and 5-*b* are same signals, respectively.

When the track centers Tc are concentric on the recording surface of disk, following operation is necessary. That is, recording is performed for one circumference using the magnetic head for recording, the magnetic head for recording is fed only for half track pitch (Tp/2) in the radius direction during a turn of the disk, recording is performed during the next turn and moreover the magnetic head is fed for half track pitch (Tp/2) during the next turn of disk. As a result, the disk must be rotated for four turns in order to complete the recording of servo pattern in regard to one track center Tc.

Therefore, a certain time is required until recording of all servo patterns is completed on the recording surface of disk. Particularly, in the case of a disk aiming at larger capacity, the track pitch Tp is rather short and many tracks are formed. Therefore, much more time is required in the recording method which requires the time for four turns of disk to record the servo pattern of one track as explained above.

In addition, in the case when it is attempted to record the servo pattern illustrated in FIG. 7 during formation of spiral track center Tc on the recording surface of disk, signal must be recorded for half track pitch (Tp/2) respectively in both sides of the spiral track. Therefore, it is impossible that the magnetic head is scanned continuously along the spiral locus to record all servo patterns with only one spiral locus. Namely, the operation to write without any gap two kinds of different signals along the spiral locus is required but such recording is substantially impossible.

SUMMARY OF THE INVENTION

The present invention has been proposed to solve the problems of the related art and it is therefore an object of the present invention to provide a disk which can complete the recording of servo pattern with the minimum rotation thereof and allows recording of servo pattern enabling formation of track of spiral locus and also provide an arithmetic processing method for the servo pattern read from the disk.

The present invention is characterized in that the servo patterns are formed without any switching of signal in the track crossing direction between track centers in the disk where servo patterns are continuously formed in the track crossing direction at the predetermined positions of the recording surface of disk and this servo pattern includes an address signal which is switched at the track center defined as the boundary, an address identifying signal which is switched at the track center defined as the boundary, an even number/odd number detecting signal for identifying the even number and odd number of the track number of each track and a tracking signal which is recorded in different conditions in both sides of the track center.

The address signal and address identifying signal are switched, for example, for every two tracks. In this case, both address signal and address identifying signal are switched, defining different track centers as the boundaries.

The tracking signal is composed, as illustrated in FIG. 1 and FIG. 2, of the A burst signal and B burst signal recorded in the position which are different in the timing defining the track center as the boundaries. Alternatively, it is also possible that the signals of different frequencies are recorded on the same position in timing in both sides of the track center.

In the present invention explained above, the signal of the same width as the track pitch Tp is recorded, for example, by the over-writing which may be attained by utilizing the magnetic head for recording having the track width which is a little larger than the track pitch Tp.

Therefore, on the occasion of recording the servo pattern matching with the concentric tracks, it is enough for magnetic head to be set to one track pitch as the feeding thereof in. the disk radius direction (track crossing direction) and recording of all servo patterns can be completed within the time equal to a half of the time required in the related art.

Moreover, on the occasion of setting the spiral track center, recording of all servo patterns can be completed by the single spiral scanning of the magnetic head for recording.

The address signal explained above is a gray code in which only one bit is different between the neighboring address signals and it is preferable that only the lest significant bit is different between the neighboring address signals. Moreover, it is also preferable that the address identifying signal is the signal of one bit or more in which the phase is changed in every two tracks.

When the gray code is used as the address signal explained above, a recognition error of an address can be set to one bit (lest significant bit in the binary value) and an error correction can be done easily even when the address is read erroneously. Particularly, in the present invention, since the address signal is switched defining the track center as the boundary, if the reproduction head is in the ON track condition, it is never freed from interference of different address signal in the neighboring track, resulting in probability for generation of erroneous detection of address value. Therefore, when the gray code is used as the address signal, error correction can be done easily at the time of arithmetic operation of address. This address signal is changed in every two tracks by defining, for example, the even number tracks as the boundaries.

Moreover, the address identifying signal is changed, for example, in every two tracks defining the track center which different from that of the address signal as the boundaries and its phase is also switched between the neighboring signals. The address identifying signal is changed, for example, defining the even number track as the boundary. Using this address identifying signal, the even or odd number truth value of the address value (address No.) indicated by the address signal can be identified. Since this address identifying signal is the shortest signal expressed by at least one bit of the binary signal, the recording space of this address identifying signal may be very narrow.

In the present invention, it is allowed that the address signal changes defining the even number track as the boundary and the address identifying signal changes defining the odd number track as the boundary.

Moreover, the even number/odd number detecting signal changes its phase in every two tracks and this signal is formed in such a manner that an amplitude of the reproduced signal is varied by interference of a couple of signals when the head scans the track center as the boundary of signals of different phases. For example, the even number/odd number detecting signal has the phase which is different by 180 degrees by defining the odd number track center as the boundary.

When the even number/odd number detecting signal is used, a class of following tracking signal can be determined easily.

Next, the servo pattern arithmetic processing method of the present invention is characterized in that the servo pattern recorded on the disk is reproduced to determine, on the basis of the reproduced output of the even number/odd number detecting signal, whether it is probable or not that erroneous detection of the address value is generated due to the interference of different address signals which are neighboring by defining the reproduced track as the boundary. When it is determined that it is probable that erroneous detection is executed, erroneously detected address value is corrected on the basis of the reproduced output of the address identifying signal.

For example, when even number or odd number of address value to be detected is identified by referring to the reproduced output of the address identifying signal and the address value which is probably detected erroneously due to the interference between the address signals is even number, the least significant bit of the address value after the address signal is binary-converted is set to "0" and when the address value which is probably detected erroneously due to the interface between the address signals is odd number, a correction is conducted so that "1" is subtracted from the address value after the address signal is binary-converted and the least significant bit is set to "1".

Moreover, when it is determined that the even No. track is reproduced from the reproduced output of the even number/odd number detecting signal, the track number can be calculated by doubling the address value obtained from the address value and when it is determined that the odd No. track is reproduced, the track number can be calculated by doubling the address value obtained from the address signal and adding 1 thereto.

In the present invention, when the even No. track of the disk is reproduced, the address No. can be calculated by doubling the address No. of the binary value converted from the address signal and when the odd No. track is reproduced, the address No. can be calculated by doubling the binary value converted from the address signal and then adding "1" thereto.

With such simplified arithmetic process, the track which is scanned by the magnetic head for reproduction can be identified easily.

Moreover, in the track where address signal changes by defining the track center as the boundary, the track No. cannot be read accurately due to the interference of address signal but interference by the address signal can be recognized by making reference to the even number/odd number detecting signal and it can be detected accurately whether or not the error correction of address value is necessary.

In addition, when it is determined as a result of reference to the even number/odd number detecting signal that the address signal is probably interfering, following error correction is performed.

That is, when different address signal is reproducing the neighboring track, it is required to refer to the address identifying signal. When the address signal which changes by defining the track center as the boundary sequentially becomes even and odd numbers with increase of the address value (when the truth value is even No.) as a insult of identification by this address identifying signal, the correction is made so that the least significant bit becomes "0" after the address value is converted to the binary value and when the address signal sequentially becomes even and odd numbers with increase of the address value (when the truth value is odd number), such address signal is converted to the binary value and thereafter "1" is subtracted to correct the least significant bit to In this error correction, an error as a result of interference by different address signal can surely be corrected. It is because only one bit of the address signal recorded by the gray code is changed between the neighboring address signals and when the address signal is converted to the binary value, a change of one bit explained above corresponds to the least significant bit. Therefore, when the truth value of the address value (address No.) can be found as the even No. or odd No., correction can be realized by processing the least significant bit as explained above. This address No. can be identified as the even No. or odd No. from the address identifying signal. When the address signal and address identifying signal which are changing in every two tracks as explained above change alternately by defining different track centers as the boundaries, if the address signal results in interference on the track, the address identifying signal does not result in any interference. When the address signal does not result in any interference, the address identifying signal results in interference. Thereby, the truth value of the address No. can be identified easily as the even number or the odd number.

The address identifying used for error correction is enough when it can identify "1" and "0" and one bit signal maybe used. Therefore, many correction bits to perform the desired bit error correction and its complicated arithmetic processes are unnecessary.

Moreover, the servo pattern arithmetic processing method of the present invention is characterized in that tracking control direction can be recognized on the basis of the even number/odd number detecting signal when the tracking signal recorded on the disk is reproduced.

In the present invention, since the tracking signal (for example, A burst signal and B burst signal) is recorded without switching between the track centers, it is impossible to avoid interference of the address signal and it is impossible to detect polarity (direction) of the tracking signal only from the address signal. Therefore, direction of tracking control is determined using the even number/odd number detecting signal.

DESCRIPTION OF THE PREFERRED EMBODIMENT

Figure 1:
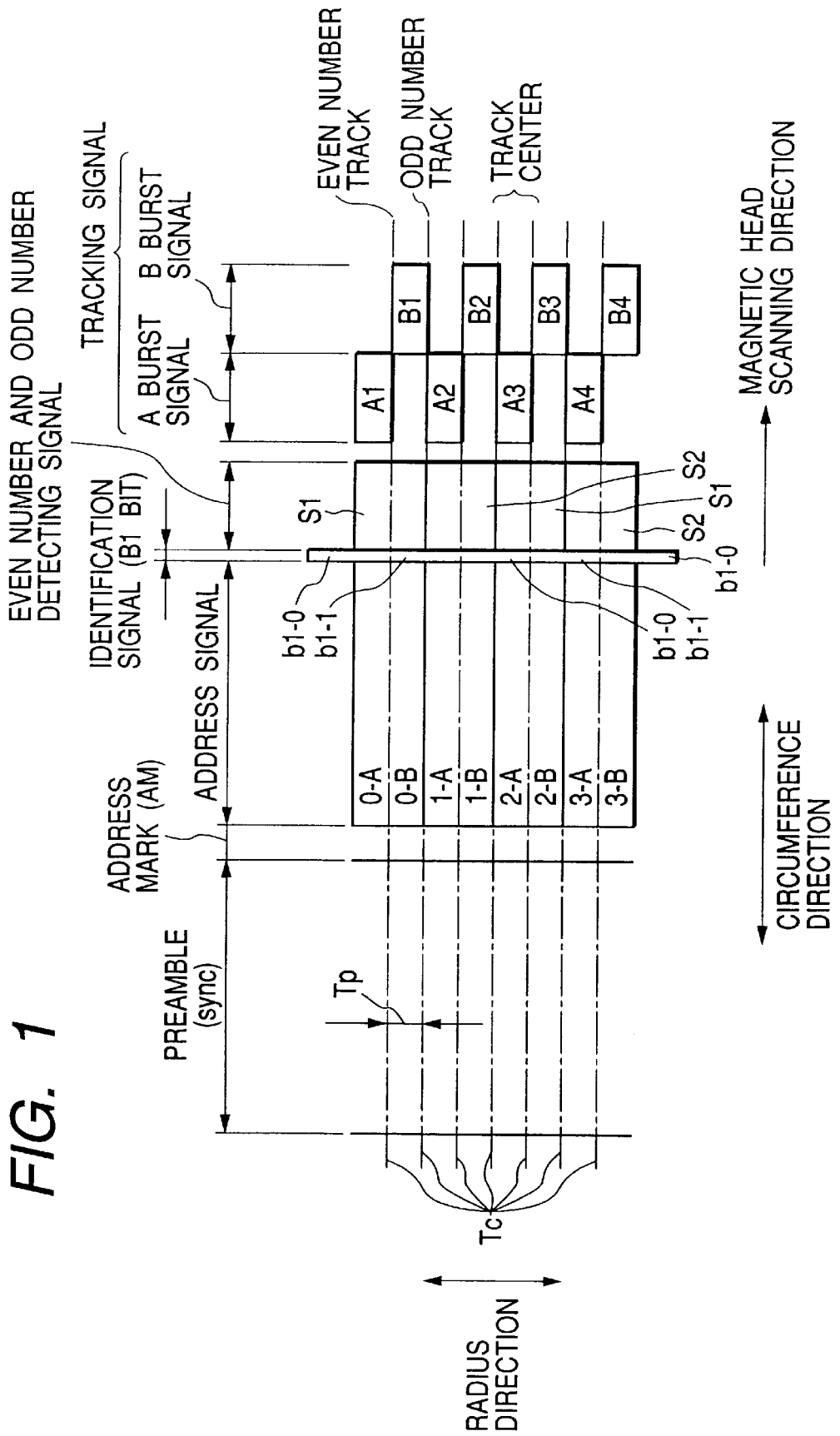
FIG. 1 is a diagram for explaining servo pattern recorded on a disk.
Figure 2:
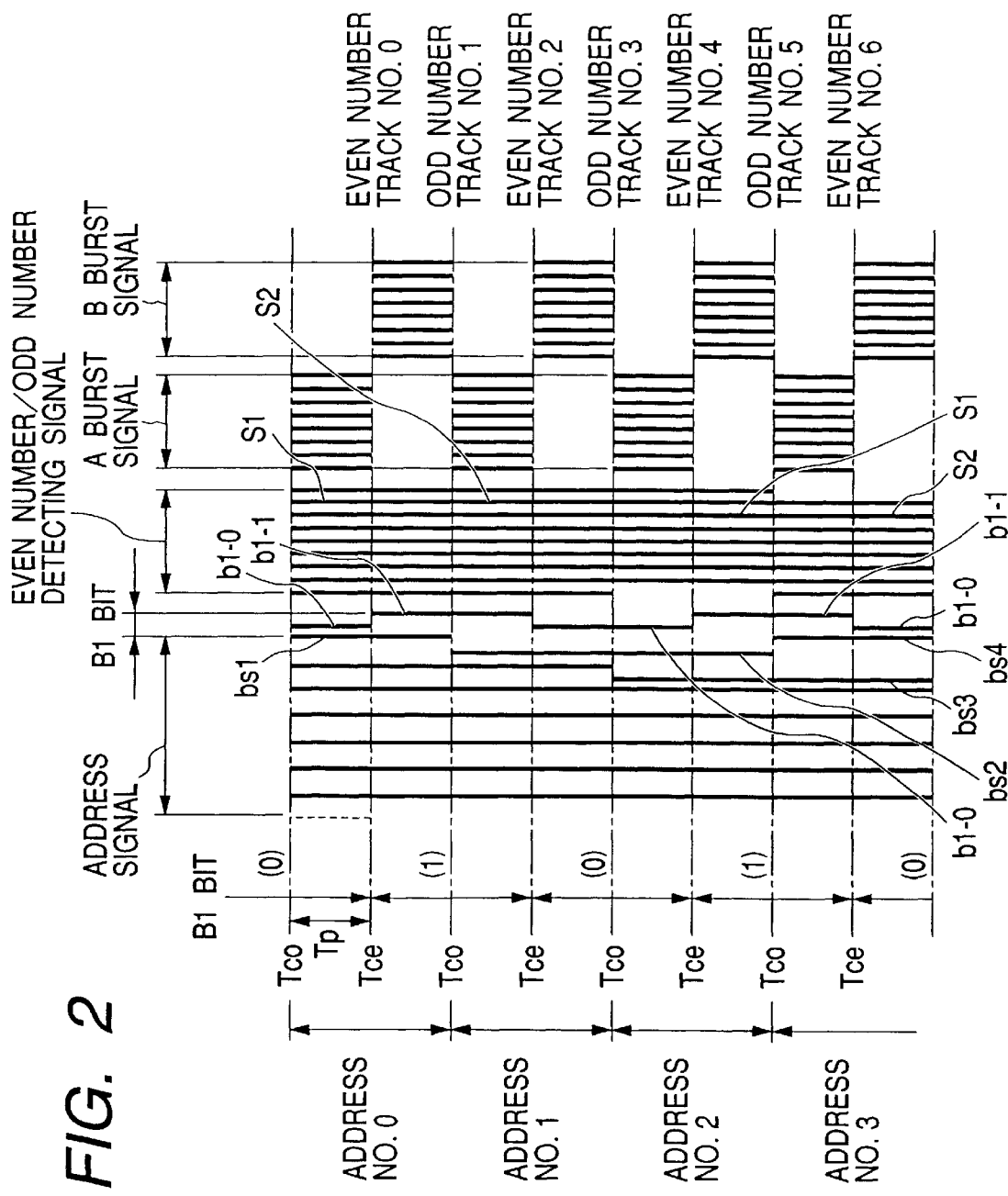
FIG. 2 is a diagram for explaining in detail the signal recording condition of the servo pattern illustrated in FIG. 1.

FIG. 1 is a schematic diagram for illustrating servo pattern recorded on a disk of the present invention. FIG. 2 is a diagram for illustrating the practical recording condition of servo pattern of FIG. 1.

Figure 6:
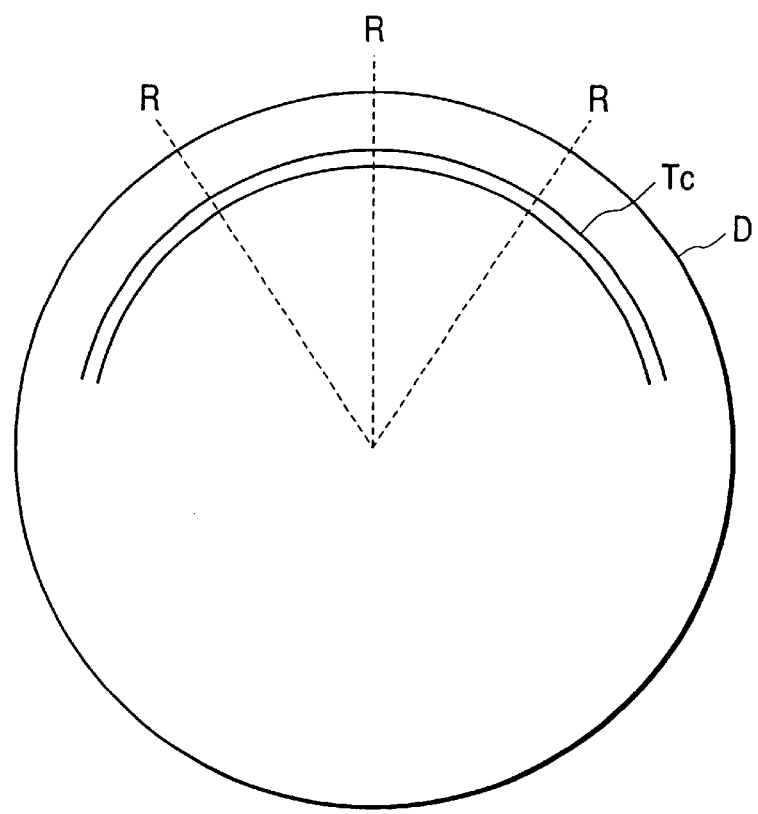
FIG. 6 is a plan view of the recording surface of the disk.
Figure 7:
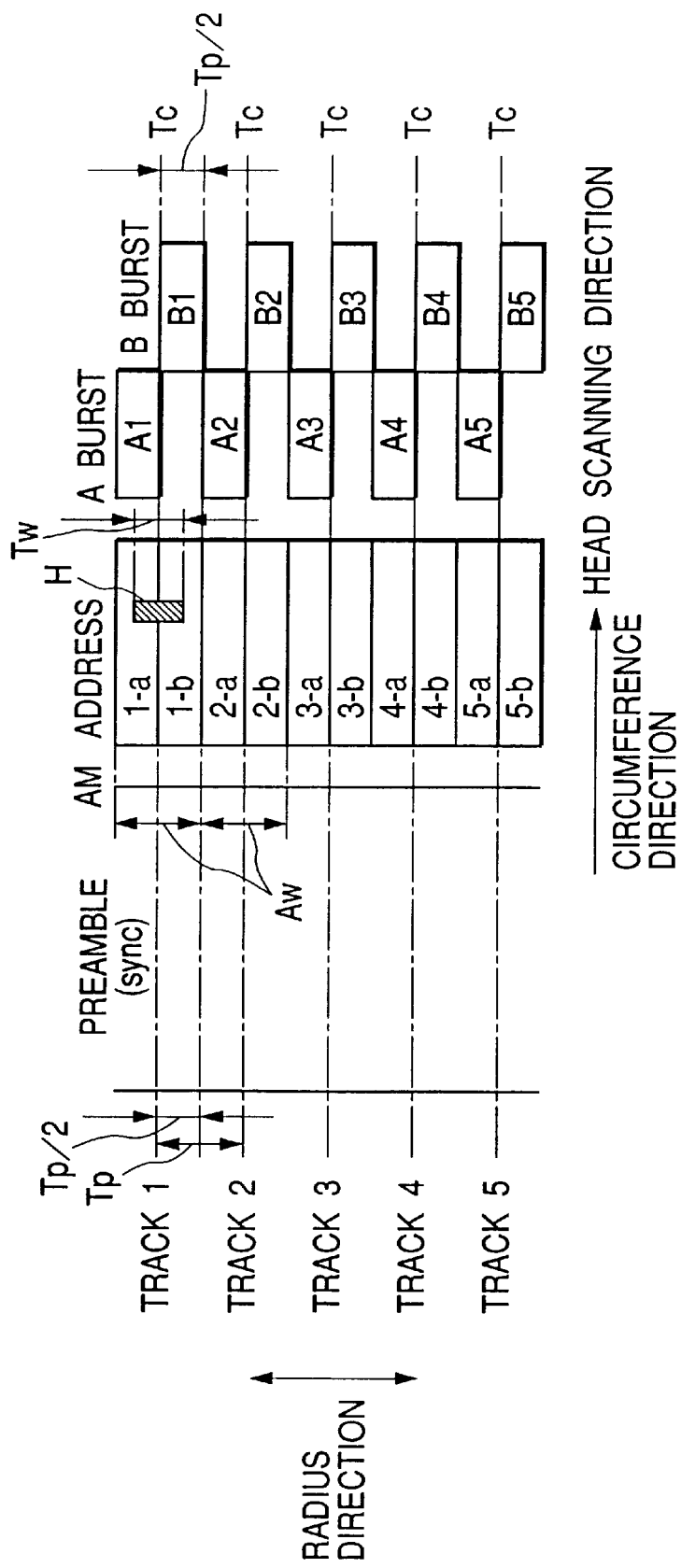
FIG. 7 is a diagram for explaining the servo pattern recorded on the magnetic disk of the related art.

As illustrated in FIG. 6, on a magnetic disk, a servo pattern is recorded continuously in the radius R direction in such a manner as crossing each track center. Moreover, the servo patterns are formed on the radius R direction of a plurality of areas. As illustrated in FIG. 1, this servo pattern is recorded first with the preamble (sync) and address mark (AM) toward the scanning direction of the magnetic head. The preamble and address mark are continuous signals without any switching in the radius direction of the disk crossing each track. The preamble is the signal where single frequency is continuous toward the head scanning direction. When the magnetic head reproduces this signal, an amplifier gain of the reproducing circuit is fixed (AGC lock).

Moreover, the signal production timing is set when the PLL circuit is locked by the preamble. The timing up to the address signal and tracking signal (A burst signal, B burst signal) can be set by reproduction of the next address mark.

When an interval (track pitch) of the track center Tc is defined as Tp, the same address signal is recorded between two track pitches (2×Tp) and the address signal is switched at the track center Tc of the odd No. tracks by defining it as the boundary.

In FIG. 2, the polarity switching area at the recording surface of magnetic disk is indicated by a thick solid line. Moreover, the track center of the even No. track is indicated as Tce, while the track center of the odd No. track as Tco.

The address signal explained above becomes the code of 7 bits when it is converted to a binary value and the transition bits are indicated as bs1, bs2, bs3, bs4 or the like. This transition bit is switched by defining the track center Tco of the odd No. track as the boundary and the address signal changes in every two track pitches (2×Tp), as a result of it, by defining the track center Tco of the odd No. track as the boundary. The address signal is recorded by the gray code so that only one bit of the reproduced output is different between the neighboring address signals. As a result of use of this gray code, the address value (address No.) is shifted one by one between the neighboring address signals. In FIG. 2, the address No. is sequentially defined as "0", "1", "2", and "3" from the above in the drawing.

Next to the address signal, the address identifying signal (hereinafter referred to as "B1 bit") is recorded. The B1 bit is different in the phase in every two tracks by defining the track center Tce of the even No. track as the boundary and is recorded as one bit between the track centers Tee of the even No. tracks. The B1 bit to obtain "1" when the reproduced output from the magnetic head is converted to the binary signal is indicated as b1-1, while the B1 bit to obtain "0" is indicated as b1-0.

The address signal and B1 bit are switched in every two track pitches (2×Tp) in the radius direction of disk (track crossing direction), but the address signal is switched at the track center Tco of the odd No. track, while the B1 bit at the track center Tce of the even No. track. The track center for the switching appears alternately for the address signal and the B1 bit.

The B1 bit is used too identify the arrangement of even and odd address numbers of the address signal located before and after the track center Tco of the odd No. track, namely to know the truth value of the address No., on the occasion of detecting the track No. of the track center Tco of the odd No. track.

Next to the B1 bit, the even number/odd number detecting signal is recorded. This even number/odd number detecting signal is used to identify that the relevant track is even number track or odd number track when the magnetic head for reproduction is scanning by the on-track condition matched or almost matched with each track center.

The even number/odd number detecting signal is switched, like the address signal, by defining the track center Tco of the odd number track as the boundary. As illustrated in FIG. 1 and FIG. 2, the signal S1 and signal S2 in the two track pitches (2×Tp) width are alternately recorded as the even number/odd number detecting signal by defining the track center Tco of the odd No. track as the boundary. Both signals S1 and S2 are repetitive signals of the same repetition frequency but the phase is changed by 180 degrees toward the scanning direction of the magnetic head between the signals S1 and S2.

Following the even number/odd number detecting signal, the tracking signal is recorded. This tracking signal includes the A burst signal and B burst signal. The A burst signal and B burst signal are continuous with the predetermined period and are set so that the intensity of respective reproduced outputs of these burst signals become identical. The A burst signal and B burst signal are recorded with deviation in the scanning direction of the magnetic head and a time difference is generated between the reproduced outputs of the A burst signal and B burst signal.

The A burst signal and B burst signal are generated in the same width size as the track pitch Tp between the track center Tce of the even No. track and track center Tco of the odd No. track.

As explained above, each signal forming the servo pattern is not switched in the track crossing direction between the track centers Tc and all signals are switched in the track crossing direction by defining the track center as the boundary.

Therefore, when writing the servo pattern to the magnetic disk using a recording apparatus, it is enough to feed the magnetic head for recording with one track pitch Tp in the radius direction of the disk. For this recording, the magnetic head for recording having the track width size which is larger than one track pitch Tp is used to over-write the signal written immediately with the new signal in order to write the signal having the width of the track pitch Tp while feeding the magnetic head with one track pitch Tp in the radius direction of disk.

When the track center Tc is set concentrically on the disk, the disk is turned once to record the preamble and address mark and also record the address signal 0-A of one track pitch width, B1 bit b1-0, even number/odd number detecting signal S1 and A burst signal A1 on a plurality of areas on the track. With the next turn of the disk, the magnetic head for recording is fed as much as one track pitch in the radius direction of the disk.

With the next turn of disk, the preamble and address mark are synchronously recorded through continuation in the radius direction with the preceding preamble and address mark and moreover the address signal 0-B (same signal as the preceding 0-A) is also synchronously recorded through continuation in the radius direction with the address signal 0-A. Moreover, the B1 bit b1-1 is also recorded to record the even number/odd number detecting signal S1 synchronously through continuation in the radius direction with the preceding even number/odd number detecting signal S1 and moreover to record the B burst B1.

Moreover, while the disk makes a turn, the magnetic head is moved as much as one track pitch Tp and with the next turn, in addition, preamble, address mark and address signal 1-A are recorded, B1 bit b1-1 is recorded in continuation with the previously recorded B1 bit b1-1. Moreover, the even number/odd number detecting signal S2, A burst signal A2 are also recorded. With repetition of this process, the servo pointer illustrated in FIG. 1 and FIG. 2 is recorded as the continuous pattern in the radius direction of the disk.

Accordingly, it is enough to make the disk one turn in order to record each signal during one track pitch Tp (between the track center Tce of the even No. track and track center Tco of the odd No. track). Therefore, when such operation is combined with the operation to feed the magnetic head for recording as much as one track pitch Tp in the radius direction of the disk, the time required for completion of recording of servo pattern of one track becomes equal to the 2-turn period of disk. Therefore, the time required for completion of recording of servo pattern to all positions of disk and all tracks thereof can reduced to a half of the time required in the related art.

In addition, since the servo pattern is recording the same signal in one track pitch, continuous recording of all servo patterns can be realized during spiral scanning of the disk in such a case where the spiral track center Tc is formed. Therefore, the present invention can also be applied to the recording system having the spiral track. When the servo pattern is recorded continuously along the spiral track as explained above, the time required for completion of recording of servo pattern can be reduced ¼ in comparison with that of the related art in which the servo pattern is recorded in the concentric tracks.

Next, the arithmetic processing method after reading the servo pattern in the disk apparatus using a disk on which the servo pattern is recorded as illustrated in FIG. 1 and FIG. 2 will then be explained.

Figure 5:
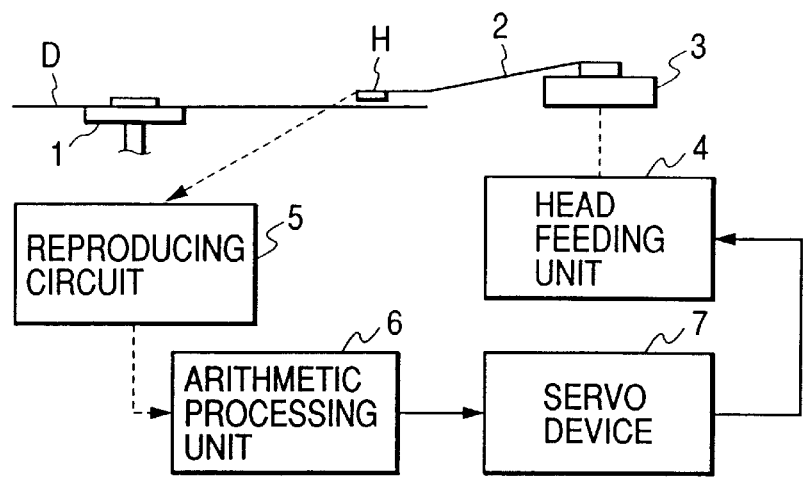
FIG. 5 is a structural diagram illustrating a reproducing apparatus for the signal recorded on the disk.

As illustrated in FIG. 5, a hub provided at the center of the disk on which the servo pattern explained above is recorded is loaded to a clamp table 1 in the disk apparatus and the disk D is driven to rotate together with the clamp table 1 by a spindle motor. The magnetic head H for reproduction is fixed at the end part of a load beam 2 and the magnetic head H is slightly pressed to the surface of disk D with a spring pressure preset by the load beam 2.

A head base 3 supporting the base end of the load beam 2 is mounted to the head feeding unit 4 such as a linear motor structure. This head feeding unit 4 feeds the magnetic head H in the radius direction of disk D.

The magnetic signal read by the magnetic head H for reproduction is sent to the reproducing circuit 5 and the reproduced data is isolated from the reproduced output of servo pattern in this reproducing circuit 5 and the reproduced output of the servo pattern is then sent to an arithmetic processing unit 6. With the arithmetic processing in this arithmetic processing unit 6, the track No. being accessed can be calculated. Moreover, the seek signal and tracking compensation signal are generated in this arithmetic processing unit 6 and these signals are then sent to the servo device 7. This servo device 7 drives the head feeding unit 4 to control the position of the magnetic head H in the disk radius direction.

Figure 3:
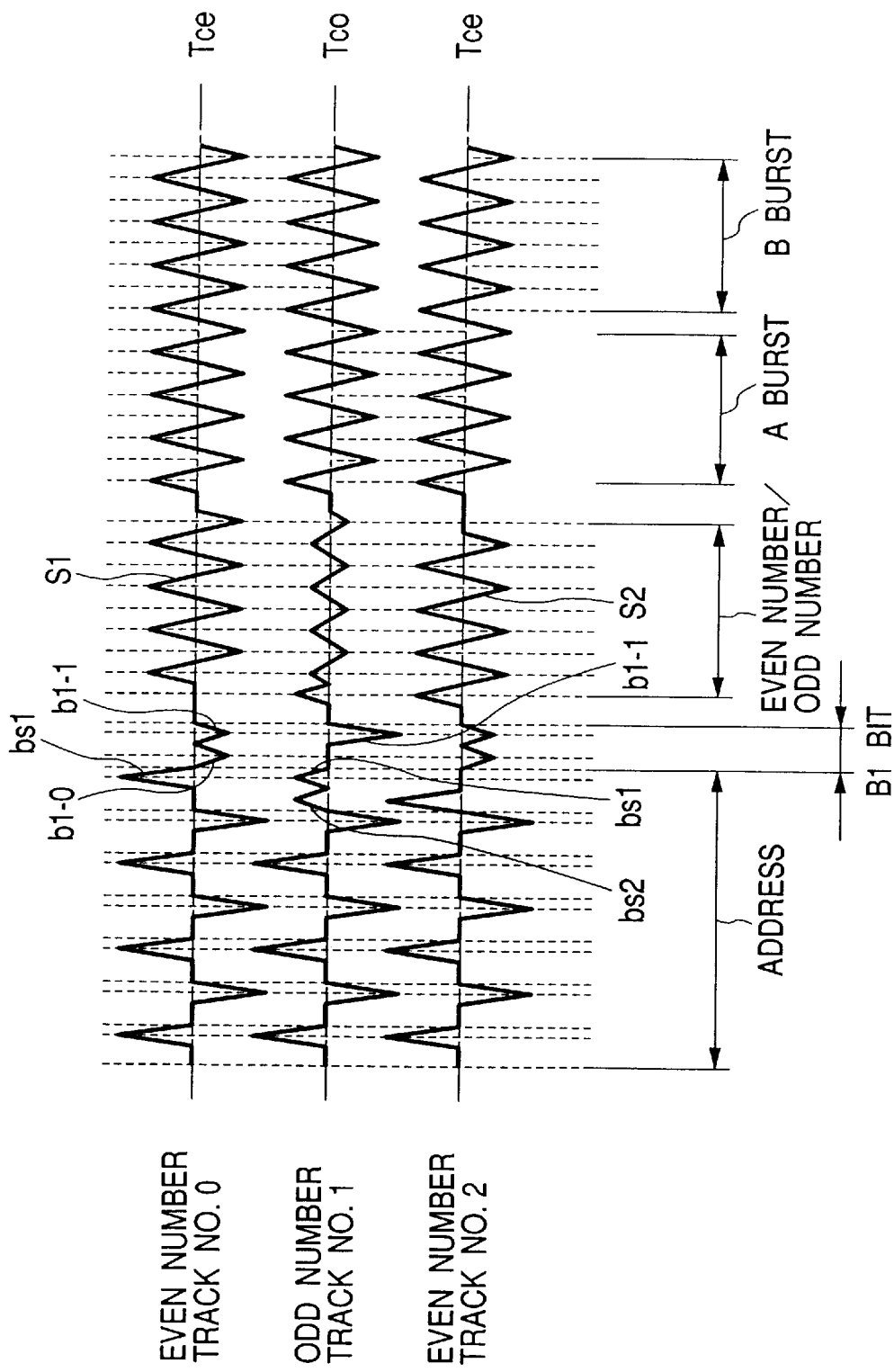
FIG. 3 is a waveform diagram when the servo pattern is reproduced.

FIG. 3 is a waveform diagram illustrating the reproduced output of the signals read from the servo pattern. The reproduced outputs of the preamble and address mark are omitted here because these signals are identical in each track. Moreover, in FIG. 2, the even number tracks and odd number tracks are alternately arranged but the track No. (address No.) of each track is defined sequentially as 0, 1, 2, 3, 4, 5, 6 from the upper side. Moreover, FIG. 3 illustrates only the reproduced output of the servo patterns of the track numbers 0, 1, 2.

First, reproduced outputs of the address signal and B1 bit will be explained. In the even number track (No. 0), waveform of the transition bit bs1 of the address signal appears. Moreover, in this even number track (No. 0), b1-0 and b1-1 of the B1 bit are switched, and therefore output waveforms of b1-0 and b1-1 are set to the value under the threshold value preset on the circuit and the reproduced output of B1 bit cannot be obtained.

In the odd number track (No. 1), the transition bits bs1 and bs2 of the address signal are switched. Therefore, the output waveforms of the transition bits bs1 and bs2 are set to the value under the threshold value preset on the circuit. However, in this odd number track (No. 1), the waveform b1-1 of the B1 bit appears. When the reproduced output of B1 bit is converted to the binary signal in the arithmetic processing unit 6, the sign thereof becomes "1".

As explained above, when the magnetic head H for reproduction is in the on-track condition on the even number track, all bits of the address signal can be read. However, when the magnetic head for reproduction is in the on-track condition on the odd number track, since the transition bits of the address signal are switched, the neighboring address signal interfere with each other and thereby the address signal is set to the unstable condition. However, reproduced output of B1 bit can be obtained in the odd number track.

Since the phase of B1 bit changes in every two tracks, "1" or "0" appears in some cases on the odd number track. In the No. 1 and No. 5 tracks of odd number tracks illustrated in FIG. 2, the code "1" can be obtained with the B1 bit. In this case, the address signal is switched in the sequence of the even number address No. and odd number address No. sandwiching the track center Tco toward code increasing direction (lower direction of FIG. 2). In the No. 3 track of the odd number tracks, the code "0" of the B1 bit can be obtained. In this case, the address signal is switched in the sequence of the odd number address No. and even number address No. sandwiching the track center Tco toward the code increasing direction.

In regard to the reproduced output of the even number/odd number detecting signal, when the magnetic head H for reproduction is in the on-track condition on the even number track as illustrated in FIG. 3, the S1 signal (for example, track No. 0) or S2 signal (for example, track No. 2) can be obtained. This signal exceeds the threshold value on the circuit and the signal of a plurality of bits can be obtained in the arithmetic processing unit 6. Meanwhile, in the even number/odd number detecting signal, the signals S1 and S2 resulting in the phase difference of 180 degrees are provided adjacently at the track center Tco of the odd number track. Therefore, when the magnetic head H for reproduction is in the on-track condition on the odd number track (for example, track No. 1), the signals S1 and S2 generate interference with each other and thereby the reproduced signal of the even number/odd number detecting signal cannot be obtained or it is under the threshold value even when it can be obtained.

As explained above, it can be identified that the magnetic head H is in the on-track condition on the even number track or odd number track depending on the fact that the reproduced output of the signal of a plurality of bits of the even number/odd number detecting signal can be obtained or not.

When the center of track width of the magnetic head is matched with the track center Tco while the magnetic head H for reproduction is scanning the odd number track, the reproduced output of the signal S1 surely results in the interference with the reproduced output of the signal S2, but even when the center of track width of the magnetic head is deviated by about ½ the track width from the track center Tco, it is possible to obtain the interfered reproduced output under the threshold value.

Moreover, since the A burst signal and B burst signal forming the tracking signal are recorded in the width Tp between the track centers, the A burst signal is located in the smaller track No. side (left side for the scanning direction of magnetic head) in the even number track and it is located in the larger track No. side (right side for the scanning direction of magnetic head) in the odd number track.

Tracking control using the signals explained above will then be explained.

When the magnetic head for reproduction is in the on-track condition, the arithmetic processing unit 6 recognizes whether the magnetic head is on the even number track or odd number track depending on the fact that an output of the even number/odd number detecting signal is obtained. The A burst signal and B burst signal obtained thereafter are converted to numerical values in their output intensity in the arithmetic processing unit 6 and a difference or ratio of output intensity of these A burst and B burst signals can be obtained numerically. A difference or ratio of the output intensity of the A burst signal and B burst signal obtained in the arithmetic processing unit 6 is given to the servo device 7, which scans the head feeding unit 4 to conduct a position control of the magnetic head H.

When the reproduced output of the even number/odd number detecting signal is recognized as "even number", position of the magnetic head H is shifted to the right side for the scanning direction if the output intensity of the A burst signal is larger than the B burst signal and position of the magnetic head H is shifted to the left side for the scanning direction if the output intensity of the B burst signal is larger than the A burst signal.

When the reproduced output of the even number/odd number detecting signal is recognized as "odd number", position of the magnetic head H is shifted to the left side for the scanning direction if the output intensity of the A burst signal is larger than the B burst signal and position of the magnetic head H is shifted to the right side for the scanning direction if the output intensity of the B burst signal is larger than the A burst signal.

As explained above, the tracking control of magnetic head can surely be conducted by recognizing the arrangement direction of the A burst and B burst signals for the scanning direction of the magnetic head from the detecting result of the even number/odd number detecting signal.

Next, the address arithmetic processing method for obtaining the track No. from the address signal during the seek operation will then be explained hereunder.

Figure 4:
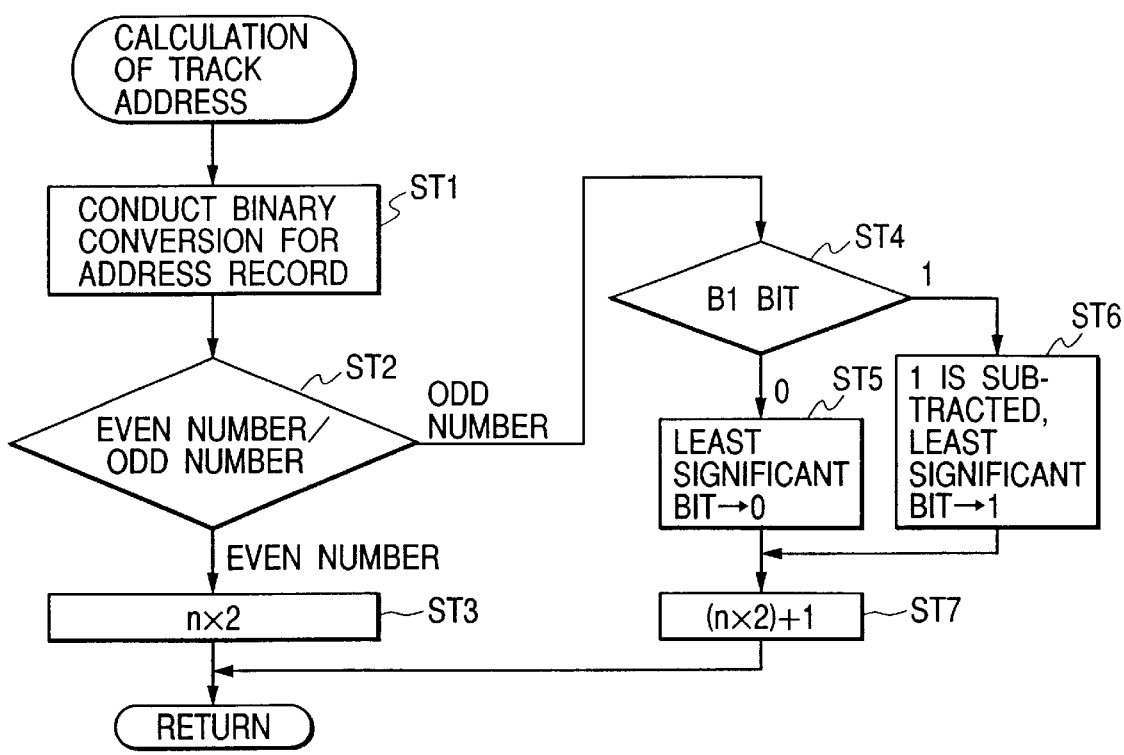
FIG. 4 is a flowchart indicating the arithmetic processing method when the servo pattern is reproduced.

Since the address signal is switched at the track center Tco of the odd number track by defining it as the boundary, there is a difference of the address calculating method of track No. in the even number track and odd number track. FIG. 4 illustrates a flowchart explaining the address arithmetic processing method.

First, in the step 1 (ST1), the address signal reproduced by the magnetic head H is converted to a binary value (binary signal). In the step 2 (ST2), it is determined that the magnetic head H has scanned the even number track or the odd number track. This determination can be done by referring to the even number/odd number detecting output. However, the odd number track can be detected when the reproduced output of B1 bit is "1" or "0", while the even number track can be detected when the reproduced output of the B1 bit cannot be obtained. Since the even number/odd number detecting signal includes many number of bits, higher accuracy can by assured when determination for even number track or odd number track is made based on the reproduced output of the even number/odd number detecting signal.

When the magnetic head is determined to be in the on-track condition on the even number track, the process shifts to the step 3 (ST3). The identical address signal is formed very widely in the width of one track pitch Tp in both sides of the track center Tce of the even number track. Therefore, when the magnetic head H for reproduction is in the on-track condition on the even number track, probability for generation of error in the read address signal is extremely low. Accordingly, when the on-track condition is occurring in the even number track, the track No. can easily be calculated by simply doubling the truth value of the binary value converted from the address signal. Calculation process will be indicated in Table 1.

TABLE 1

| Track No. | | Address No. | | Address × 2 | |
| --- | --- | --- | --- | --- | --- |
| No. | Binary value | No. | Binary value | No. | Binary value |
| 0 | 0000000 | 0 | 0000000 | 0 | 0000000 |
| 2 | 0000010 | 1 | 0000001 | 2 | 0000010 |
| 4 | 0000100 | 2 | 0000010 | 4 | 0000100 |
| 6 | 0000110 | 3 | 0000011 | 6 | 1000110 |

For example, when the magnetic head H for reproduction is scanning the track No. 4, the address value obtained as a result of conversion of address signal to binary value is "2". The track No. 4 can be calculated by doubling the address "2" to "4".

Next, when it is determined that the on-track condition is occurring on the odd number track in the step (ST2), following process is performed. In the odd track, the address signal is switched at the track center Tce by defining as the boundary. The track No. of the odd number tracks can be calculated by defining the smaller address No. of the signal value among two address signals switched at the track center Tce as the truth value, doubling this truth value and then adding 1 to such doubled truth value.

For example, when odd track No. is "5", only the address signal Nos. "2" and "3 " are switched at the track center Tco defined as the boundary. Therefore, the smaller value "2" is defined as the truth value and then "1" is added to the doubled "2" to calculate the track No. "5".

However, in the odd number track, the address signal is switched at the track center Tco defined as the boundary as explained above. Therefore, when the magnetic head for reproduction scans the odd number track, the neighboring address signal results in the interference and thereby the truth value cannot surely be obtained when the address signal is converted to the binary value and probability for error is very high. At the area where the address signal is switched in the track center Tco, only the transmission bit changes as illustrated in FIG. 2. Therefore, it is assumed that read error of the address signal is caused only by the transition bit. The address signal is gray code and in the binary value converted from the gray code, error is generated only in the least significant bit when an error is generated due to the switching of the transition bit.

Therefore, when an error is generated in the truth value of the address signal to be used for calculation of the track No. (track address), the binary value when an error is generated is surely equal to "Truth value +1". As illustrated in the table 2, for example, the truth value of the address No. used for calculation of address of the track No. 3 is "1", but when an error is generated by the switching of the transition bit, the binary value when the error is generated is "2". In the same manner, the truth value of the address No. used for address calculation of track No. 5 is "2", but it is also possible that the address converted to the binary value becomes "3" due to the error by switching of the transition bit.

Therefore, in the case of the odd number track, correction is necessary so that the truth value can be obtained even when an error is generated or not in the value when the address signal is converted to the binary value. This correction changes depending on the fact that the truth value of the address signal used for calculation of the track No. is even number or odd number. In the present invention, difference in correction can be identified by the code of the B1 bit signal.

As illustrated FIG. 2, the code when the B1 bit is converted to the binary signal is "1" in the No. 1 and No. 5 odd number tracks. In this case, however, the smaller address No. (truth value used for calculation of track No.) among those expressed by the address signal which is switched at the track center Tco defined as the boundary is "0" and "2" which are even numbers.

In the odd number track No. 3, the code when the B1 bit is converted to the binary signal is "0", but in this case, the smaller address No. among those switched at the track center Tco defined as the boundary (truth value used for calculation of track. No.) is "1" which is the odd number.

Therefore, when the truth value for calculating the track No. is an even number, error correction can be realized by setting the least significant bit of the binary value converted from the address signal to "0". For example, in the track No. 5, illustrated in the Table 2, the truth value of the address No. is "0000010" ("2" in decimal number). In this case, the binary value when an error is generated due to the switching of the transition bit of the address signal becomes "0000011" after addition of 1. The truth value "0000010" of the address No. can be obtained by conducting the correction to set the least significant bit of both signals to "0".

Next, when the "truth value" used for calculation of the track No. is odd number, error correction can be realized by subtracting "1" from the binary value converted from the address signal and then setting the least significant bit to "1". For example, in the track No. illustrated in Table 2, the truth value of address No. is "0000001" ("1" in the decimal number). In this case, the binary value when an error is generated by switching of the transition bit of the address signal becomes equal to "0000010" after increment of 1. The truth value of the address No. "0000001" can be obtained by subtracting 1 from both signals and then setting the least significant bit to "1".

The track No. of the odd number track can be calculated by doubling the truth value corrected as explained above and then adding 1 to such doubled truth value. For example, as illustrated in the table 2, the value "3" of the track No. 3 can be obtained by doubling the truth value of the address signal and then adding 1 to such doubled value.

TABLE 2

| Track No. | Address No. | | B1 Code | 1 is (1) → Least significant bit → 0 B1 is (0) → 1 is subtracted, least significant bit → 1 | Address after correction 2 + 1 | |
|---|---|---|---|---|---|---|
| | No. | Binary value | | | Binary value | No. |
| 1 | 0 | 0000000 | (1) | 0000000 | 0000001 | 1 |
| | 1 | 0000001 | | 0000000 | | |
| 3 | 1 | 0000001 | (0) | 0000001 | 0000011 | 3 |
| | 2 | 0000010 | | 0000001 | | |
| 5 | 2 | 0000010 | (1) | 0000010 | 0000101 | 5 |
| | 3 | 0000011 | | 0000010 | | |

The process for calculating the above track No. of the odd number tracks will be explained with reference to FIG. 4. When it is determined that on-track condition is generated on the odd number track in the step (ST2), the binary signal obtained by converting the reproduced signal of the B1 bit is determined whether it is "1" or "0" in the step 4(ST4). When the code of B1 bit is "0", correction to set the least significant bit to 0 is conducted to obtain the truth value in the step 5(ST5). When the code of B1 bit is "1", 1 is subtracted from the address signal converted to the binary value in the step 6(ST6) and the least significant bit is set to "1" to obtain the truth value.

In the step 7(ST7), the track No. can be calculated by doubling the obtained truth value and then adding 1 thereto.

What is claimed is:

1. An arithmetic processing method for a servo pattern, comprising:

reproducing servo patterns recorded on a disk, the disk comprising a recording surface having tracks each having a track center and having the servo patterns, the servo patterns being continuous in a radial direction and recorded at predetermined positions on the recording surface, a portion of the servo patterns formed without any signal change in the radial direction, each servo pattern including an address signal having an address value, an address identifying signal, an even number/odd number detecting signal that identifies whether a track number of the track is an even number or an odd number, and a tracking signal that is recorded differently on different sides of the track center, wherein a phase of the even number/odd number detecting signal, the address signal, and the address identifying signal change every two tracks, the phase of the even number/odd number detecting signal and the address signal changing at a first track center of the track centers in the two tracks thereby forming a boundary between the phases of the even number/odd number detecting signals, the address identifying signal changing at a second track center of the track centers in the two tracks, and an amplitude of a reproduced signal changes due to interference of neighboring signals when a magnetic head scans the first track center;

determining whether there is a probability for generation of erroneous detection of the address value due to interference of neighboring different address signals at a reproducing track on the basis of a reproduced output of said even number/odd number detecting signal; and correcting the address value of erroneous detection on the basis of a reproduced output of said address identifying signal when it is determined that there is probability for said erroneous detection.

2. An arithmetic processing method for the servo pattern according to claim 1, wherein an even number or odd number of the address value to be detected is identified by making reference to the reproduced output of the address identifying signal, a least significant bit of the address value after said address signal is converted to a binary value is set to "0" when the address value which may be detected erroneously by interference between address signals is the even number, and an error correction is conducted so that "1" is subtracted from the address value after said address signal is converted to the binary value and then the least significant bit is set to "1" when the address value which may be detected erroneously by interference between address signals is the odd number.

3. An arithmetic processing method for the servo pattern according to claim 1 wherein the track number is calculated by doubling the address value obtained from the address signal when the even number track is determined to be reproduced from the reproduced output of said even number/odd number detecting signal and the track number is calculated by doubling the address value obtained from the address signal and then adding "1" to the doubled value when the odd number track is determined to be reproduced.

4. An arithmetic processing method for the servo pattern according to claim 1, wherein tracking control direction is recognized on the basis of the reproduced output of said even number/odd number detecting signal.

5. A disk comprising a recording surface having tracks each having a track center and having servo patterns that are continuous in a radial direction and recorded at predetermined positions on the recording surface, a portion of the servo patterns formed without any signal change in the radial direction, each servo pattern including an address signal having an address value, an address identifying signal, an even number/odd number detecting signal that identifies whether a track number of the track is an even number or an odd number, and a tracking signal that is recorded differently on different sides of the track center, wherein a phase of the even number/odd number detecting signal, the address signal, and the address identifying signal change every two tracks, the phase of the even number/odd number detecting signal and the address signal changing at a first track center of the track centers in the two tracks thereby forming a boundary between the phases of the even number/odd number detecting signals, the address identifying signal changing at a second track center of the track centers in the two tracks, and an amplitude of a reproduced signal changes due to interference of neighboring signals when a magnetic head scans the first track center.

6. A disk according to claim 5, wherein the address signal is formed by a gray code in which only one bit changes between neighboring address signals, and the address identifying signal is a signal of at least one bit.

7. A disk according to claim 5, wherein the even number/odd number detecting signal is adjacent to the address identifying signal.

* * * * *